(12) United States Patent
Koeppe

(10) Patent No.: US 8,587,905 B2
(45) Date of Patent: Nov. 19, 2013

(54) MULTI-CHANNEL TAPE HEAD HAVING ASYMMETRIC CHANNEL ARRAYS

(75) Inventor: Peter VanderSalm Koeppe, San Diego, CA (US)

(73) Assignee: International Busiess Machines Corporation, Armonk, NY (US)

( * ) Notice: Subject to any disclaimer, the term of this patent is extended or adjusted under 35 U.S.C. 154(b) by 0 days.

(21) Appl. No.: 13/480,390

(22) Filed: May 24, 2012

(65) Prior Publication Data

US 2012/0236433 A1 Sep. 20, 2012

Related U.S. Application Data

(62) Division of application No. 12/047,075, filed on Mar. 12, 2008, now Pat. No. 8,233,246.

(51) Int. Cl.
*G11B 5/33* (2006.01)
*G11B 5/127* (2006.01)

(52) U.S. Cl.
USPC .......................................... 360/316; 360/121

(58) Field of Classification Search
USPC .................................................. 360/121, 316
See application file for complete search history.

(56) References Cited

U.S. PATENT DOCUMENTS

| | | | |
|---|---|---|---|
| 5,027,245 A | 6/1991 | Nagata et al. | |
| 5,208,714 A | 5/1993 | Denison et al. | |
| 5,218,498 A * | 6/1993 | Jagielinski | 360/316 |
| 5,436,780 A | 7/1995 | Nagata et al. | |
| 5,917,671 A | 6/1999 | Kaaden et al. | |
| 5,982,591 A * | 11/1999 | Folkerts et al. | 360/121 |
| 6,038,108 A | 3/2000 | Dee et al. | |
| 7,266,880 B2 | 9/2007 | Biskeborn et al. | |
| 8,233,246 B2 | 7/2012 | Koeppe | |
| 2002/0034042 A1 | 3/2002 | Hungerford et al. | |
| 2005/0018349 A1* | 1/2005 | Eaton | 360/129 |
| 2005/0122623 A1 | 6/2005 | Dee | |
| 2005/0134989 A1* | 6/2005 | Girvin et al. | 360/61 |
| 2005/0152066 A1* | 7/2005 | Yip | 360/241.1 |
| 2005/0152067 A1* | 7/2005 | Yip et al. | 360/241.1 |
| 2005/0168865 A1* | 8/2005 | Simmons et al. | 360/77.12 |
| 2007/0047123 A1 | 3/2007 | Czarnecki et al. | |
| 2007/0047146 A1 | 3/2007 | Biskeborn et al. | |
| 2008/0137235 A1 | 6/2008 | Biskeborn et al. | |
| 2009/0231756 A1 | 9/2009 | Koeppe | |

OTHER PUBLICATIONS

Restriction/Election Requirement from U.S. Appl. No. 12/047,075 dated Feb. 14, 2011.

(Continued)

*Primary Examiner* — Brian Miller
*Assistant Examiner* — Adam B Dravininkas
(74) *Attorney, Agent, or Firm* — Zilka-Kotab, PC

(57) ABSTRACT

In one general embodiment, a magnetic head comprises an inner module comprising an array of data readers; and first and second outer modules flanking the inner module. The outer modules are identical, each outer module comprising an array of data writers. A number of active data writers in each outer module is less than a number of active data readers in the inner module. For the first outer module, one of the active data writers is aligned with one of the data reader positioned towards a first end of the inner module array in a direction generally parallel to the path of tape travel thereacross. For the second outer module, one of the active data writers is aligned with one of the data readers positioned towards a second end of the inner module array in the direction generally parallel to the path of tape travel thereacross.

12 Claims, 10 Drawing Sheets

(56) References Cited

OTHER PUBLICATIONS

Non-Final Office Action Summary from U.S. Appl. No. 12/047,075 dated Mar. 23, 2011.
Non-Final Office Action Summary from U.S. Appl. No. 12/047,075 dated Aug. 8, 2011.
Final Office Action Summary from U.S. Appl. No. 12/047,075 dated Dec. 1, 2011.
Advisory Action from U.S. Appl. No. 12/047,075 dated Feb. 16, 2012.
Notice of Allowance and Fee(s) Due from U.S. Appl. No. 12/047,075 dated Mar. 23, 2012.

* cited by examiner

MULTI-CHANNEL TAPE HEAD HAVING ASYMMETRIC CHANNEL ARRAYS

RELATED APPLICATION

This application is a divisional of U.S. patent application Ser. No. 12/047,075, filed Mar. 12, 2008, which is herein incorporated by reference.

FIELD OF THE INVENTION

The present invention relates to magnetic head structures, and more particularly, this invention relates to a magnetic head structure having asymmetric channel arrays.

BACKGROUND OF THE INVENTION

Business, science and entertainment applications depend upon computing systems to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 896 or more data tracks.

SUMMARY OF THE INVENTION

In one general embodiment, a magnetic head comprises an inner module comprising an array of data readers; and first and second outer modules flanking the inner module. The outer modules are identical, each outer module comprising an array of data writers. A number of active data writers in each outer module is less than a number of active data readers in the inner module. For the first outer module, one of the active data writers is aligned with one of the data reader positioned towards a first end of the inner module array in a direction generally parallel to the path of tape travel thereacross. For the second outer module, one of the active data writers is aligned with one of the data readers positioned towards a second end of the inner module array in the direction generally parallel to the path of tape travel thereacross.

A magnetic head according to yet another embodiment comprises an inner module comprising an array of data writers; and first and second outer modules flanking the inner module. The outer modules are identical, each outer module comprising an array of data readers. A number of active data readers in each outer module is less than a number of active data writers in the inner module. For the first outer module, one of the active data readers is aligned with one of the data writers positioned towards a first end of the inner module array in the direction generally parallel to the path of tape travel thereacross. For the second outer module, one of the active data readers is aligned with one of the data writers positioned towards a second end of the inner module array in the direction generally parallel to the path of tape travel thereacross.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a representative diagram of an 8-channel, side by side (or interleaved) magnetic head with two servo readers per module above a diagram of an 8-channel, paired (e.g., piggy-backed, merged, or otherwise aligned) symmetric magnetic head with four servo readers per module.

FIG. 5 is a representative diagram of an 8-channel, side by side magnetic head with two servo readers per module above a diagram of a 16-channel, magnetic head with two servo readers per module.

FIG. 6 is a representative diagram of an 8-channel, side by side magnetic head with two servo readers per module above a diagram of a 16-channel magnetic head with two servo readers per module above a diagram of a 24-channel merged multiformat magnetic head with two servo readers per module per format.

FIG. 7 is a representative diagram of an 8-channel, side by side magnetic head with two servo readers per module above a diagram of a 16-channel magnetic head with two servo readers per module above an embodiment of a 32-channel, backward compatible magnetic head with four servo readers per module.

FIG. 8 is a representative diagram of an 8-channel, side by side magnetic head with two servo readers per module above a diagram of a 16-channel magnetic head with two servo readers per module above an embodiment of a 32-channel, asymmetric, backward compatible magnetic head with two servo readers per module.

FIG. 9 is a representative diagram of an 8-channel, side by side magnetic head with two servo readers per module above a diagram of a 16-channel magnetic head with two servo readers per module above an embodiment of a 32-channel, merged multiformat magnetic head with two servo readers per module per format.

FIG. 10 is a representative diagram of a magnetic head having multiple modules according to one embodiment.

FIG. 11 is a representative diagram of a magnetic head having multiple modules according to another embodiment.

DETAILED DESCRIPTION

Figure 1:
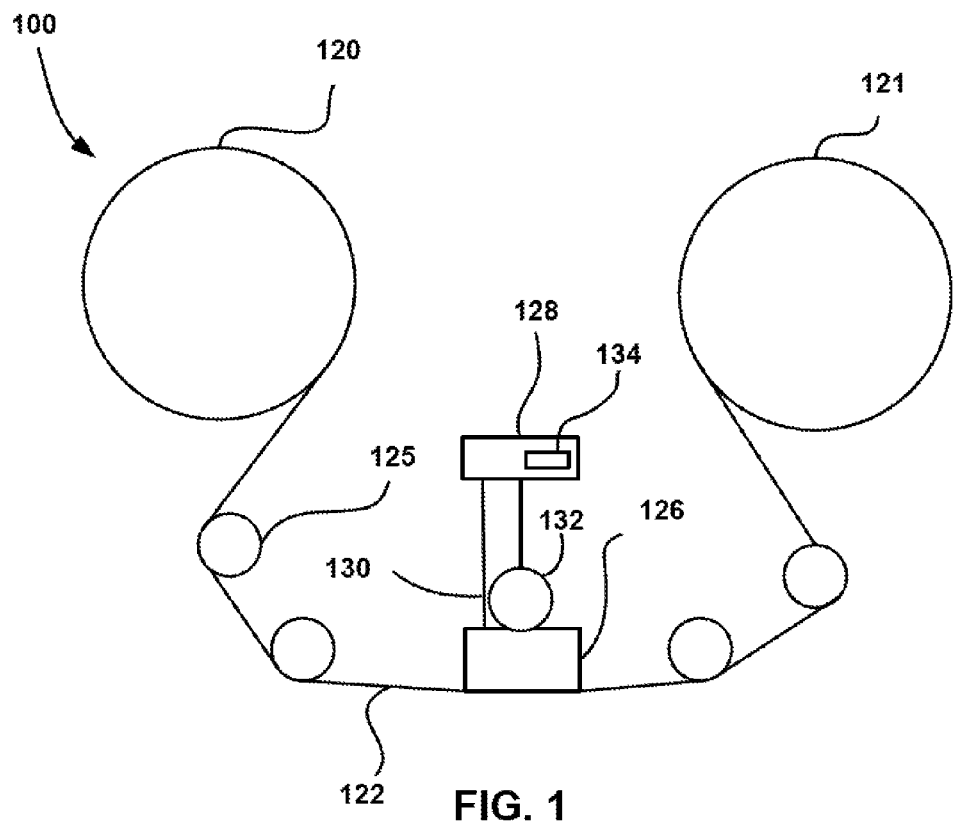
FIG. 1 is a schematic diagram of a simplified tape drive system according to one embodiment.

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

The embodiments described below disclose a new head design that is capable of reading and/or writing to magnetic media such as magnetic tape in multiple formats. For example, the head can write and/or read data in both legacy and advanced formats, and in doing so can enable full backward compatibility with legacy media types. This is an important criterion for customers wishing to move to a new format yet having data stored on media in an older format.

This following description also presents solutions to the problem of designing and making a magnetic tape head which is backward compatible with prior tape formats, and which can be built from two or more face-to-face modules two or more of which are generally identical, and have a minimal set of transducers. In particular, embodiments disclosed below provide a solution for such head to have only two servo readers per module and/or per format; whereas previous concepts suggest requiring a minimum three or more servo readers per format per module. The following description also provides identical module solutions to merged array heads wherein rotational symmetry may otherwise not exist or be broken.

A magnetic head according to one general approach comprises identical, opposing modules. Each module comprises an array of paired data transducers, the transducers being including data readers, data writers, or combinations thereof. For each array, the transducers in each subset may have about the same center to center spacing. A first subset of the transducers is operable for reading or writing data in a first tape format. A second subset of the transducers is operable for reading or writing data in a second tape format, with at least some of the transducers being present in both subsets. Also, each module includes a lone writer at one end of one of the subsets, a lone reader at an opposite end of the one of the subsets, and servo readers positioned outside the array. "Identical" as used herein means that the modules are designed to have the same transducer layout, and possibly as similar a structure as possible given processing constraints and tolerances.

Another general embodiment comprises a magnetic head which comprises identical, opposing modules. Each module comprises an array of data transducers, the transducers including data readers, data writers, or combinations thereof. A first subset of the transducers is operable for reading or writing data in a first tape format. A second subset of the transducers is operable for reading or writing data in a second tape format, with at least some of the transducers being present in both subsets. Also included are servo readers positioned outside the array. For each module, one of the data transducers is positioned along a centerline of the array.

In another embodiment, a magnetic head comprises identical, opposing modules. For each module, only one servo reader may be positioned on each side of the array. Also, for each module, the data transducer positioned along the centerline of the array may belong to only one of the subsets. Further, for each array, the transducers in the first subset may have the same center to center spacing as the transducers in the second subset. Conversely, for each array, the transducers in the first subset may have a different center to center spacing than the transducers in the second subset. In this and other embodiments, a magnetic head may also comprise, for each module, a pair of servo readers interleaved with the transducers as shown as head 902 in FIG. 9.

In another general approach, a tape drive system comprises a magnetic head comprising identical, opposing modules. Also, a drive mechanism for passing a magnetic recording tape over the head is included, along with a controller in communication with the head.

In a further general embodiment, a magnetic head comprises an inner module comprising an array of data readers; and first and second outer modules flanking the inner module. The outer modules are identical, each outer module comprising an array of data writers. A number of active data writers in each outer module is less than a number of active data readers in the inner module. For the first outer module, one of the active data writers is aligned with one of the data reader positioned towards a first end of the inner module array in a direction generally parallel to the path of tape travel thereacross. For the second outer module, one of the active data writers is aligned with one of the data readers positioned towards a second end of the inner module array in the direction generally parallel to the path of tape travel thereacross.

A magnetic head according to yet another embodiment comprises an inner module comprising an array of data writers; and first and second outer modules flanking the inner module. The outer modules are identical, each outer module comprising an array of data readers. A number of active data readers in each outer module is less than a number of active data writers in the inner module. For the first outer module, one of the active data readers is aligned with one of the data writers positioned towards a first end of the inner module array in the direction generally parallel to the path of tape travel thereacross, For the second outer module, one of the active data readers is aligned with one of the data writers positioned towards a second end of the inner module array in the direction generally parallel to the path of tape travel thereacross.

In another embodiment, the tape drive system is part of a larger library of tape drive systems that provide coordinated data backup using several drives.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
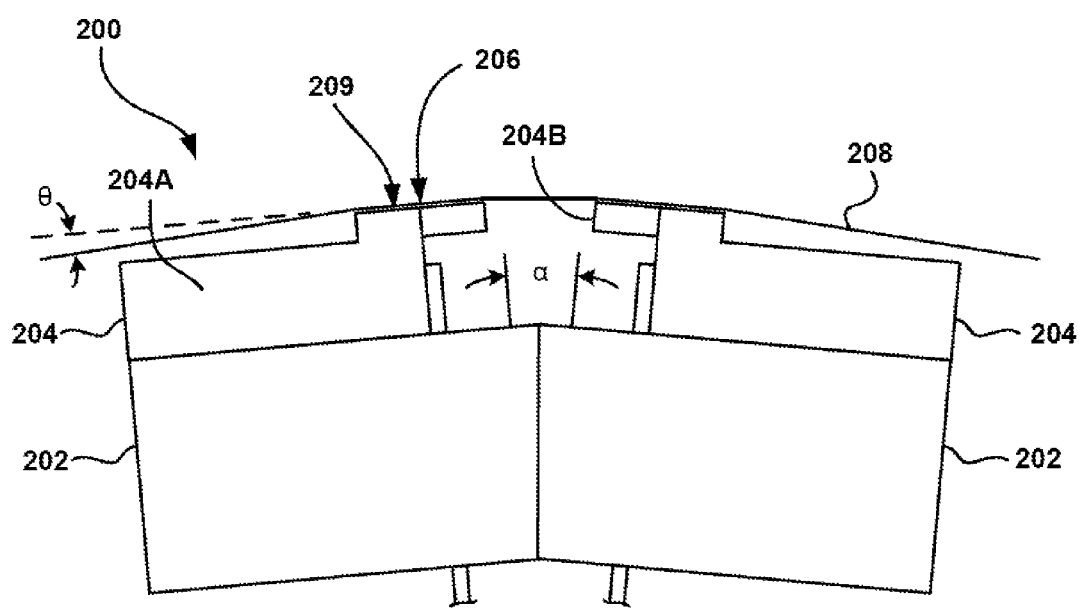
FIG. 2 illustrates a flat-lapped bi-directional, two-module magnetic tape head which may be implemented in the context of the present invention.

By way of example, FIG. 2 illustrates a flat-lapped bi-directional, two-module magnetic tape head 200 which may be implemented in the context of the present invention. As shown, the head includes a pair of bases 202, each equipped with a module 204, and fixed at a small angle α with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4.5 degrees.

The substrates 204A are typically constructed of a wear resistant material, such as a ceramic. The closures 204B are typically made of the same or similar ceramic as the substrates 204A.

The readers and writers may be arranged in a paired configuration, meaning that pairs of readers and writers are each present on about a same track location relative to a tape. Types of paired configurations include, but are not limited to, piggybacked transducers, merged transducers, etc. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo readers.

Figure 3:
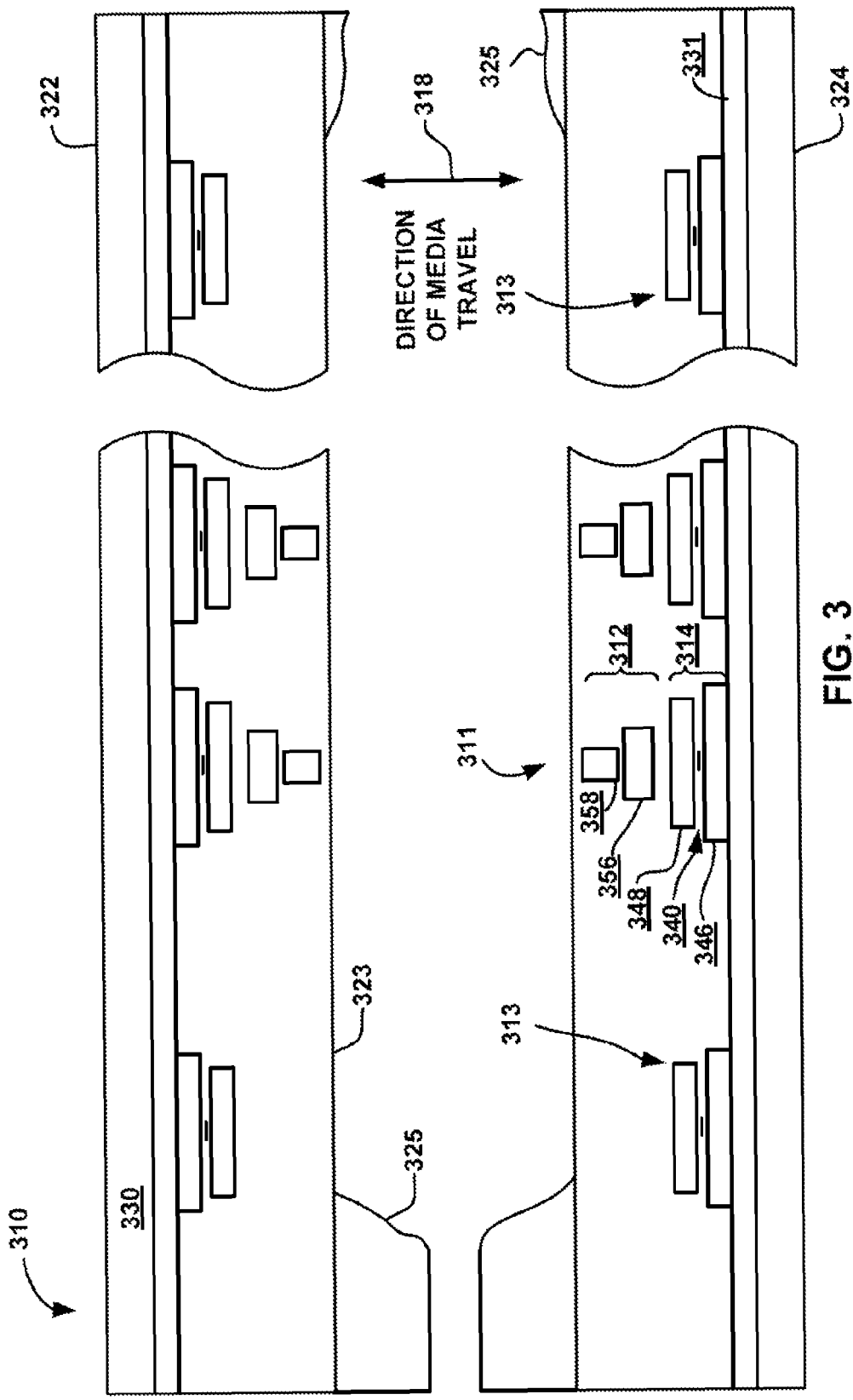
FIG. 3 is a partial tape bearing surface view of a magnetic tape head according to one embodiment.

FIG. 3 shows a partial tape bearing surface (TBS) view of a magnetic tape head assembly 310 according to one embodiment having a plurality of read/write (R/W) pairs in a paired configuration formed on a common substrate 330 and an optional electrically insulative layer 331. The writers, exemplified by the write head 312 and the readers, exemplified by the read head 314, are aligned parallel to a direction of travel of a tape medium thereacross to form a R/W pair, exemplified by the R/W pair 311.

Several R/W pairs 311 may be present, such as 8, 16, 32 pairs, etc. The R/W pairs 311 as shown are linearly aligned in a direction generally perpendicular to a direction of tape travel thereacross. However, the pairs may also be aligned diagonally, etc. Servo readers 313 are positioned on the outside of the array of R/W pairs, the function of which is well known.

Generally, the magnetic tape medium moves in either a forward or reverse direction as indicated by arrow 318. The magnetic tape medium and head assembly 310 operate in a transducing relationship in the manner well-known in the art. The paired MR head assembly 310 includes two thin-film modules 322 and 324 of generally identical construction.

Modules 322 and 324 are joined together with a space present between closures 325 thereof (partially shown) to form a single physical unit to provide read-while-write capability by activating the writer of the leading module and reader of the trailing module aligned with the writer of the leading module parallel to the direction of tape travel relative thereto. When a module 322, 324 of a head 310 having paired transducers is constructed, layers are formed in the gap 323 created above an electrically conductive substrate 330 (partially shown), e.g., of AlTiC, in generally the following order for the R/W pairs 311: an insulating layer 331, a first shield 346 typically of an iron alloy such as NiFe (permalloy), CoZrTa or Al—Fe—Si (Sendust), a sensor 340 for sensing a data track on a magnetic medium, a second shield 348 typically of a nickel-iron alloy (e.g., 80/20 Permalloy), first and second writer pole tips 356, 358, and a coil (not shown).

The first and second writer poles 356, 358 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
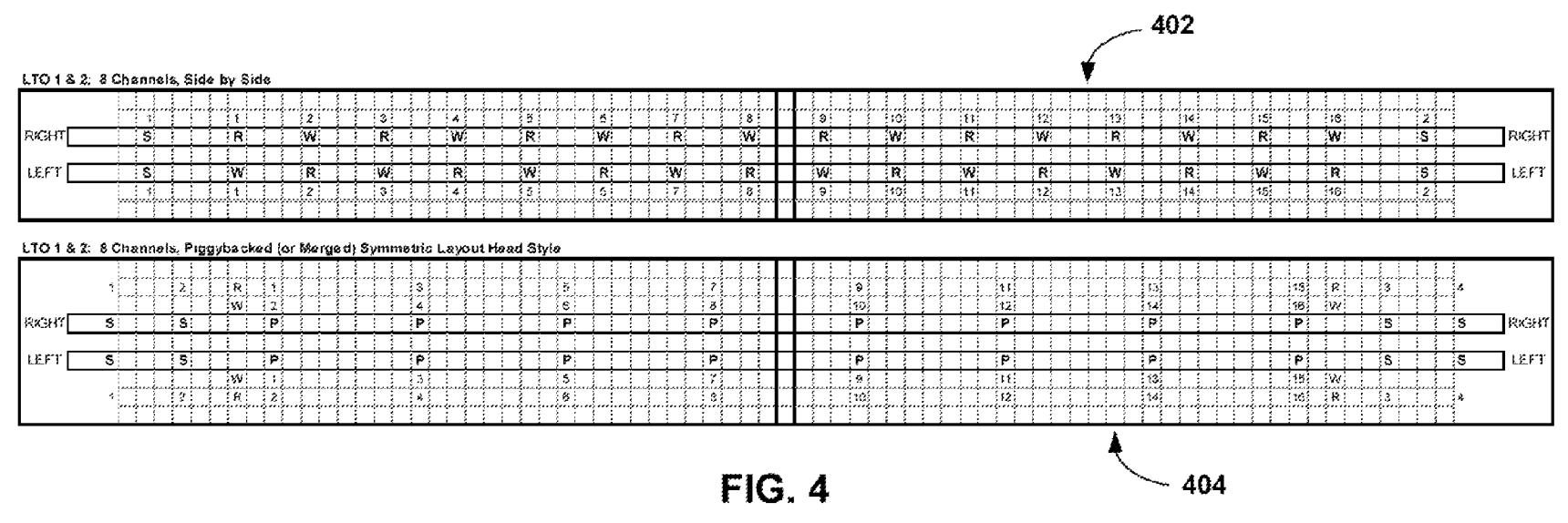

By way of example, FIG. 4 shows a diagram of an 8-channel, side by side (or interleaved) asymmetric magnetic head 402 with two servo readers per module above a diagram of an 8-channel, paired transducer, symmetric magnetic head 404 with four servo readers per module. In FIG. 4, R denotes a reader, W denotes a writer, P denotes a transducer pair (reader and writer), and S denotes a servo reader. For head 404, the R and W indicate a reader and writer for each transducer pair. The numbering system above and below each reader, writer, servo reader and transducer pair indicates one example of how to number the readers and writers. Head 402 is an asymmetric head because the readers and writers do not line up vertically on the head. However, this configuration allows for two identical modules to be used to construct the head: one on the top, and one rotated 180° on the bottom. Again, identical in the context of the present description means that the modules are designed to have the same transducer layout, and possibly as similar a structure as possible given processing constraints and tolerances.

The symmetric head 404 is constructed of two modules, one for the top, and one for the bottom. In addition to manufacturing advantages of producing identical modules as opposed to two unique modules is that of using two servo readers per module over using four servo readers per module. This advantage is a reduced chance of failure due to servo reader failure. A total of four servo readers on head 402 means that head 402 has a lower chance of failing compared to head 404, which has a total of eight servo readers. Therefore, through use of less servo readers per module, there is less chance of head failure in the example of head 402. Also, in order to read and write on the proper track, head 404 is moved side-to-side to align the servo readers (S) with the servo tracks, which would generally be spaced as indicated by the servo readers on head 402. This slight movement can cause wear on the head resulting in head failure or servo motor failure due to increased use over the lifetime of the system. In addition, this movement requires larger margins inside the tape drive to provide for the head's extended motion. The increased chance of failure and larger margins requirement exist for any head using multiple servo readers per module side and is not limited to this example.

Figure 5:
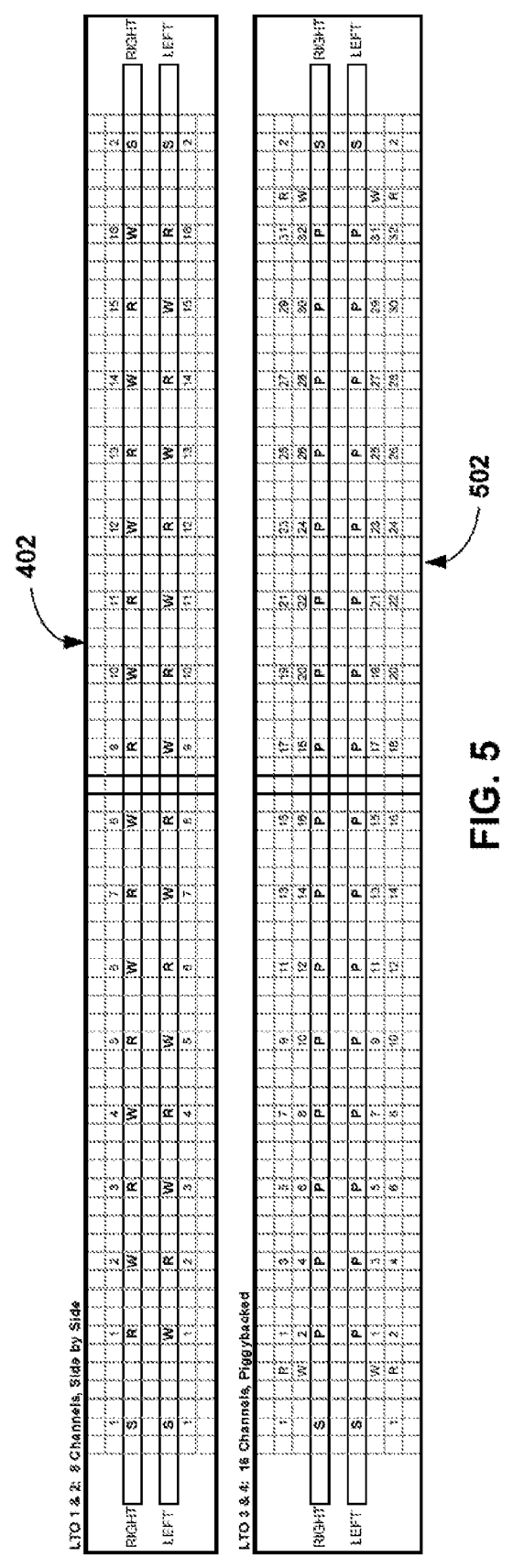

FIG. 5 is a representative diagram of an 8-channel, side by side asymmetric magnetic head with two servo readers per module above a diagram of a 16-channel, symmetric magnetic head with paired transducers and two servo readers per module. In FIG. 5, R denotes a reader, W denotes a writer, P denotes a transducer pair (reader and writer), and S denotes a servo reader. For head 502, the R and W indicate a reader and writer for each transducer pair. The numbering system above and below each reader, writer, servo reader and transducer pair indicates one example of how to number the readers and writers.

In this example, head 502 is a 16-channel head that can be constructed of two identical modules, one for the top and one for the bottom. Identical in the context of this example means that the modules are designed to have the same transducer layout, and possibly as similar a structure as possible given processing constraints and tolerances. Head 502 also has two servo readers per module, which is consistent with head 402 which results in fewer head failures due to servo reader failure.

Figure 6:
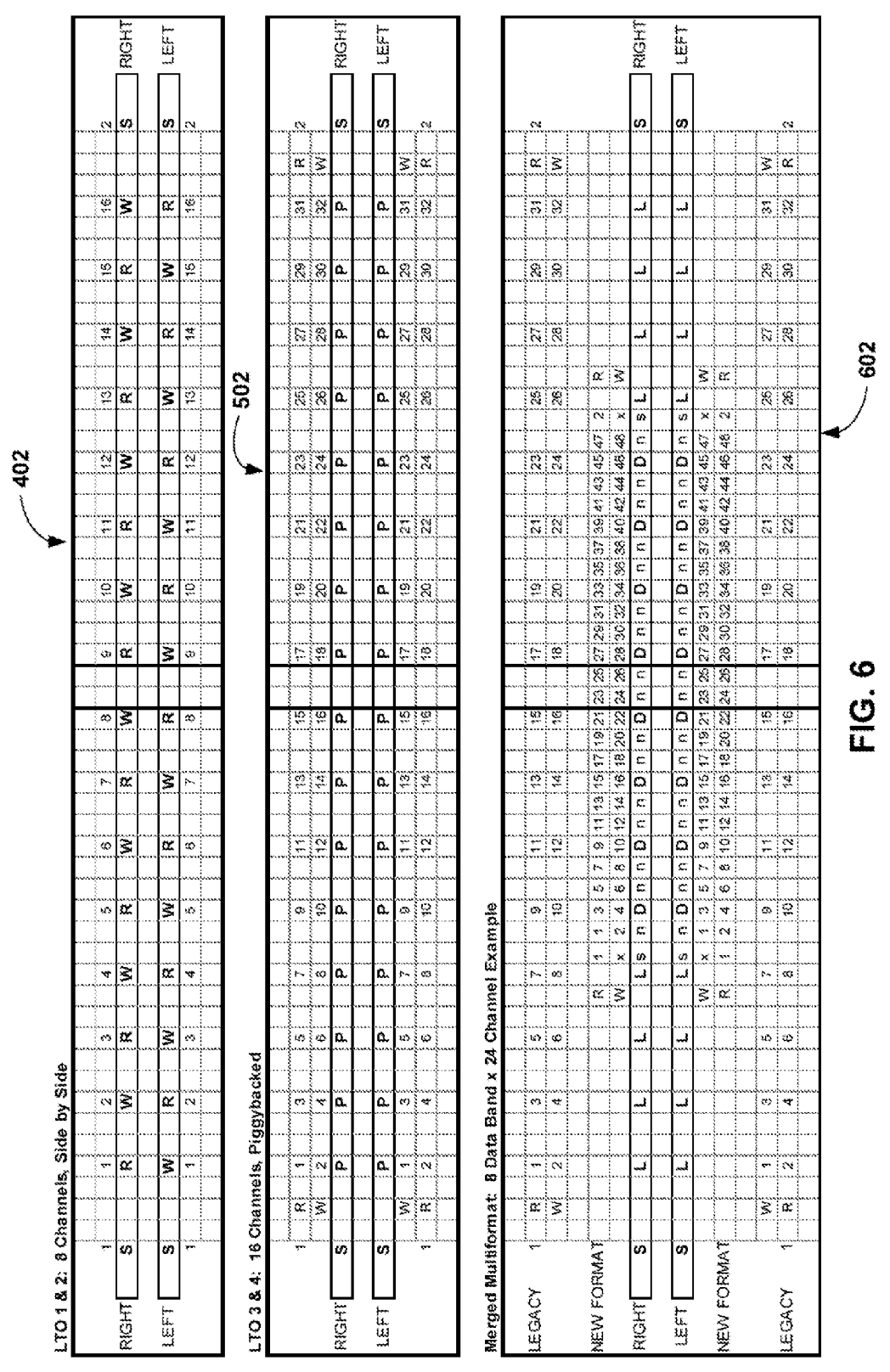

FIG. 6 is a representative diagram of an 8-channel, side by side asymmetric magnetic head 402 with two servo readers per module above a diagram of a 16-channel, symmetric magnetic head 502 with paired transducers and two servo readers per module above a diagram of a 24-channel, 8-data band, symmetric merged multiformat magnetic head 602 with two servo readers per module per format. In FIG. 6, R denotes a reader, W denotes a writer, P denotes a transducer pair (reader and writer), L denotes a legacy transducer pair, D denotes a dual-use transducer pair, n denotes a new generation transducer pair, S denotes a legacy servo reader, and s denotes a new generation servo reader. For heads 502 and 602, the R and W indicate a reader and writer for each transducer pair. The numbering system above and below each reader, writer, servo reader and transducer pair indicates one example of how to number the readers and writers. An x indicates that there is no active transducer of this type at this location on the module. Heads 502 and 602 have symmetry about the module centerline and head centerline, whereas head 402 is asymmetric. On head 602, channel pitch for the new generation readers and writers (N and D) are on a pitch which is three times smaller in this 24-channel example than in the 8-channel or 16-channel examples (heads 402 and 502, respectively). In this example, head 602 shows a 24-channel head that can be constructed of two identical modules, one for the top and one for the bottom that is capable of reading and writing in 16-, or 24-channel formats. Identical in the context of this example means that the modules are designed to have the same transducer layout, and possibly as similar a structure as possible given processing constraints and tolerances.

Figure 7:
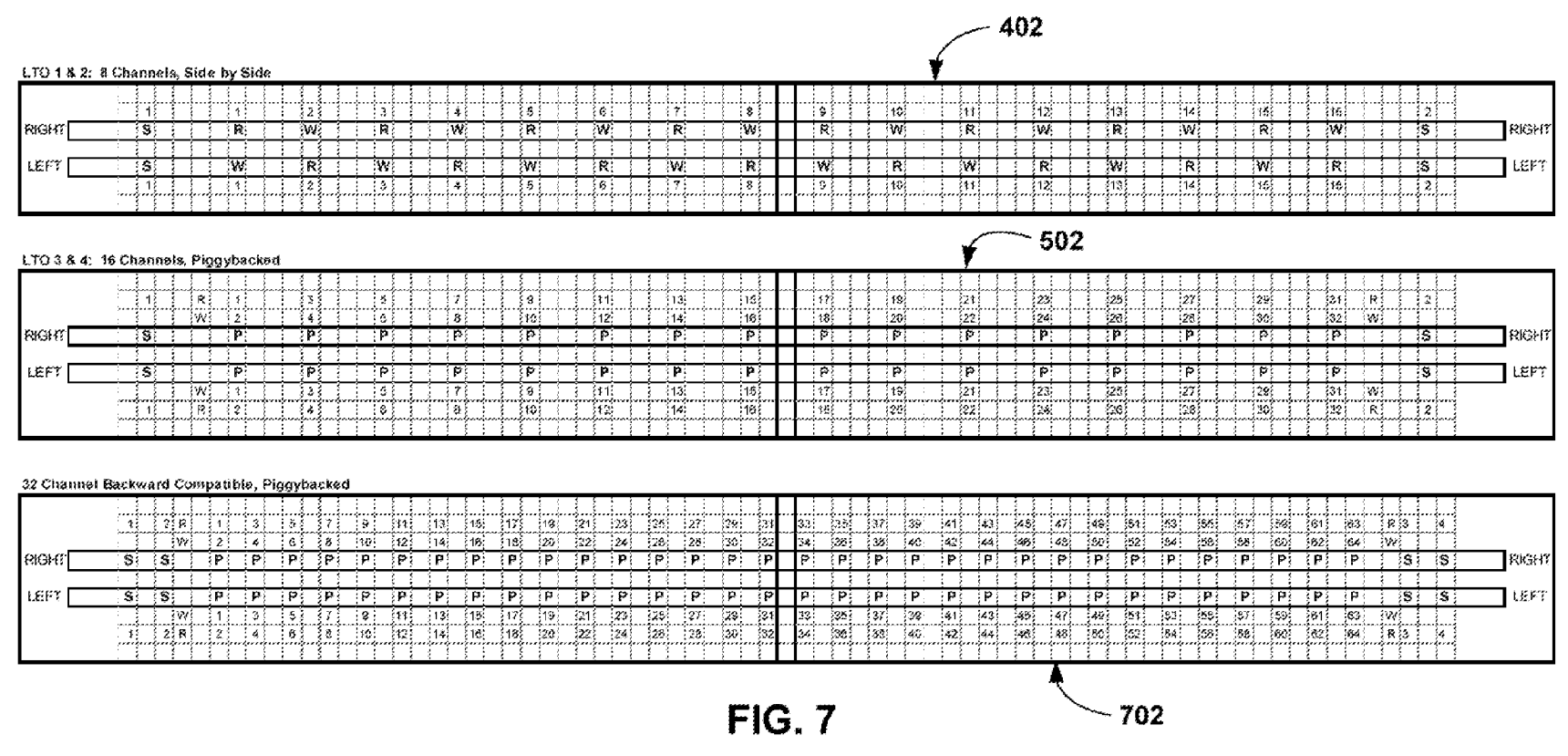

FIG. 7 is a representative diagram of an 8-channel, side by side asymmetric magnetic head 402 with two servo readers per module above a diagram of a 16-channel, symmetric magnetic head 502 with paired transducers and two servo readers per module above a 32-channel, backward compatible symmetric magnetic head 702 with paired transducers and four servo readers per module. In FIG. 7, R denotes a reader, W denotes a writer, P denotes a transducer pair (reader and writer), and S denotes a servo reader. For heads 502 and 702, the R and W indicate a reader and writer for each transducer pair. The numbering system above and below each reader, writer, servo reader and transducer pair indicates one example of how to number the readers and writers. Typically, servo readers 2 and 3 may be used for 32-channel format reading and writing, while servo readers 1 and 3 and/or servo readers 2 and 4 may be used for 16-channel format reading and writing. In this embodiment, head 702 may be moved slightly side-to-side to align the servo readers with the servo track indicated on heads 402 and 502 by the servo reader (S) locations. In this way, the readers and writers may be aligned to read and write on the proper track positions. This layout is similar to head 404 in FIG. 4 except that the servo reader to servo reader distance on head 702 is equal to the paired transducer (P) pitch, while the servo reader to servo reader distance on head 404 in FIG. 4 is one-half the paired transducer (P) pitch. Having the servo reader to servo reader distance equal to the paired transducer (P) pitch allows head 702 backward compatibility with 16-channel formats rather than compatibility with the format optimized from the interleaved head.

In another embodiment, a 32-channel magnetic head, similar to that shown in FIG. 7, uses three servo readers per module, resulting in an asymmetric magnetic head capable of backward compatibility with 16-channel heads.

Figure 8:
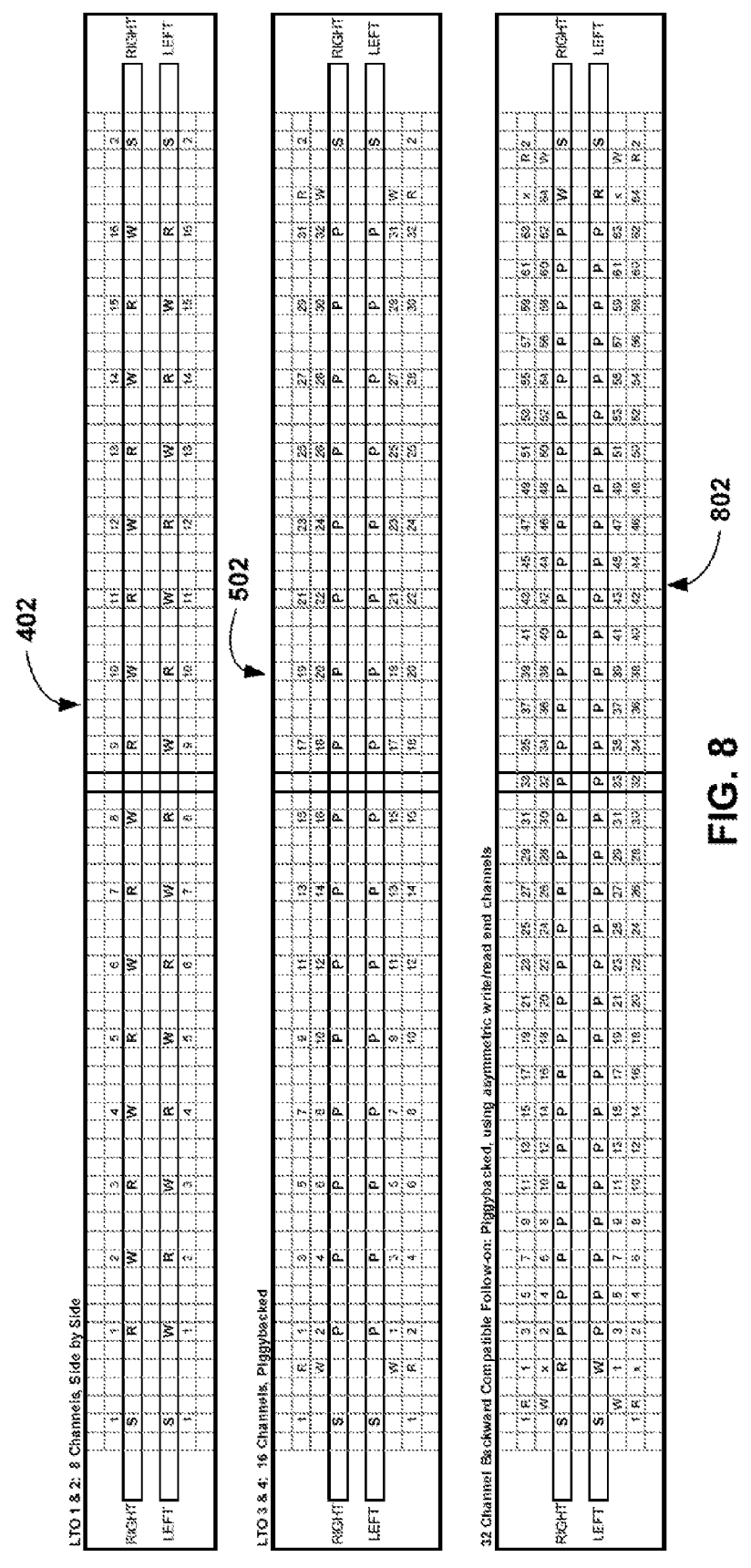

FIG. 8 includes a representative diagram of an 8-channel, side by side asymmetric magnetic head 402 with two servo readers per module above a diagram of a 16-channel, symmetric magnetic head 502 with paired transducers and two servo readers per module above an illustrative diagram of a head 802 according to one embodiment. This embodiment is a 4-data band, 32-channel, asymmetric, backward compatible magnetic head 802 with paired transducers and two servo readers per module. In FIG. 8, R denotes a reader, W denotes a writer, P denotes a transducer pair (reader and writer), and S denotes a servo reader. For heads 502 and 802, the R and W indicate a reader and writer for each transducer pair. The numbering system above and below each reader, writer, servo reader and transducer pair indicates one example of how to number the readers and writers.

In this embodiment, head 802 can be constructed of two identical, opposing modules, one for the top and one for the bottom, which can read and write in 16- and 32-channel formats. Identical in the context of this embodiment means that the modules are designed to have the same transducer layout, and possibly as similar a structure as possible given processing constraints and tolerances. On head 802, the end channel on each module has one reader or writer instead of a transducer pair, depending on the location. As shown, the writer is on the right side of the top ("RIGHT") module, with the reader on the left side of the top module. This arrangement can be reversed, with the writer on the left side of the top module, and the reader on the right side of the top module, as long as a corresponding change is made to the bottom ("LEFT") module. As shown, there are 32 data channels for the new generation readers/writers, but these are spread across 33 locations on each module, with a transducer pair (P) now on the module centerline.

For each module, a distance between the servo readers could be such that the servo readers read servo bands on a tape written in the first format and servo bands on a tape written in the second format. In the illustrative embodiment shown, only one servo reader is positioned on each side of a given array. Further, the servo reader to servo reader distance on head 802 is about the same as in heads 402 and 502, with servo readers 1 and 2 used for both 32-channel and 16-channel formats. An illustrative servo reader spacing is 2858.9 µm, but, of course, will vary from format to format, i.e., may be higher or lower.

Also, the top and bottom modules may be manufactured with a transducer pair (P) on each end, with one transducer pair (P) only operational for one of the writer or reader, and the other transducer pair (P) only operational for the reader or writer, respectively, or other combinations, as appropriate. This allows for simplified manufacturing since only one type of transducer design (P) is to be manufactured, instead of three different types (W, R, P).

Head 802 combines the concepts of the interleaved head into use with present-day heads by splitting a transducer pair into a single interleaved writer and reader pair split to the ends of the array, while centering the rest of the array (of an odd number of transducers, for example) to the centerline of the module. The active transducer count is minimized, including the servo readers, without loss of function, while also maintaining symmetric and identical modules in the cases of both 2-module and 3-module heads. By having a minimal set of transducers, head complexity and usage is minimized while head manufacturing (i.e., yield) is maximized. By having identical modules, manufacturing simplicity is maximized.

Figure 9:
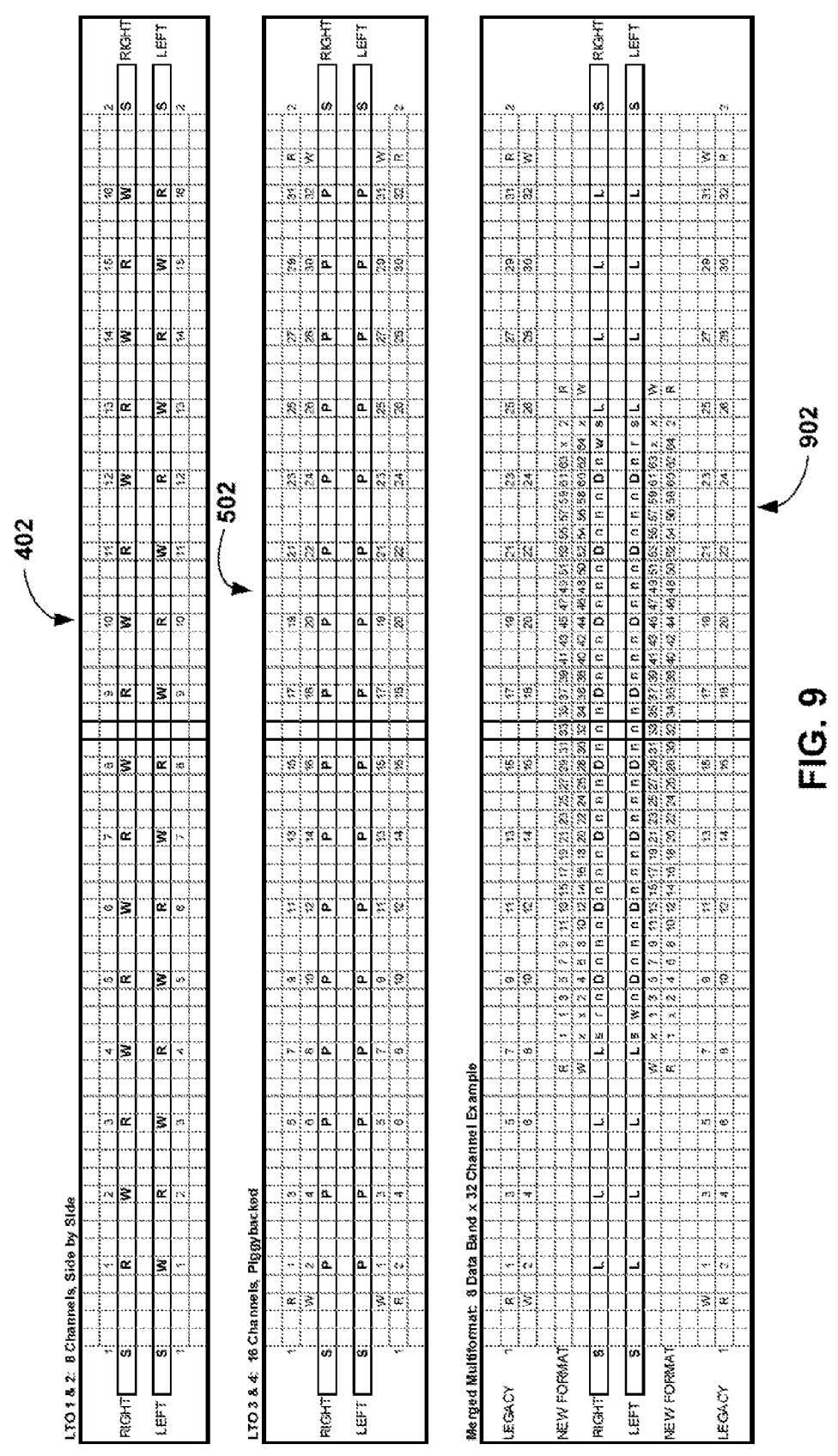

FIG. 9 is a representative diagram of an 8-channel, side by side asymmetric magnetic head 402 with two servo readers per module above a diagram of a 16-channel, symmetric magnetic head 502 with paired transducers and two servo readers per module above one illustrative embodiment 902. This example 902 is of a 32-channel, 8-data band, merged multiformat magnetic head 902 having two modules, each module having an array of transducers. Each array of transducers has a first subset of transducers (legacy format) and a second subset of transducers (new format). Each subset of an array has two servo readers associated with it. In FIG. 9, R denotes a reader, W denotes a writer, P denotes a transducer pair (reader and writer), L denotes a legacy transducer pair, D denotes a dual-use transducer pair, n denotes a new generation transducer pair, S denotes a legacy servo reader, and s denotes a new generation servo reader. For head 502, the R and W indicate a reader and writer for each transducer pair. The numbering system above and below each reader, writer, servo reader and transducer pair indicates one example of how to number the readers and writers. An x indicates that there is no active transducer of this type at this location on the module.

With continued reference to head 902 of FIG. 9, for each array of transducers, the transducers in the first subset have a different center to center spacing than the transducers in the second subset. In this embodiment, one of the paired data transducers might be positioned along a centerline of the array. Also, for each module, the paired data transducer positioned along the centerline of the array belongs to only one of the subsets, here the subset associated with the new format. Another possibility is that for each module, a pair of servo readers may be interleaved with the transducers as shown as head 902 in FIG. 9.

Heads 402 and 502 have symmetry about the module centerline and head centerline, whereas head 902 is asymmetric. In this embodiment, the heads 402, 502, 902 can be constructed of two identical modules, one for the top and one for the bottom, which can read and write in 8-, 16- and 32-channel formats, respectively. Also, head 902 is backward compatible with 16-channel, 4-data band formats, while capable of writing the 32-channel new format across 8 data bands. Head 902 has 8 dual-use pairs of transducers (D) with a four times decrease in the channel pitch of pairs (n) surrounding them (4×8=32 channels). There are 33 data transducer locations in the new format array, with a single transducer pair (n) split into a single writer (w) and single reader (r) placed at the ends of the array. In this embodiment, there are a total of 168 transducers (84 per module), but other numbers of transducers are possible.

Figures 10, 11:
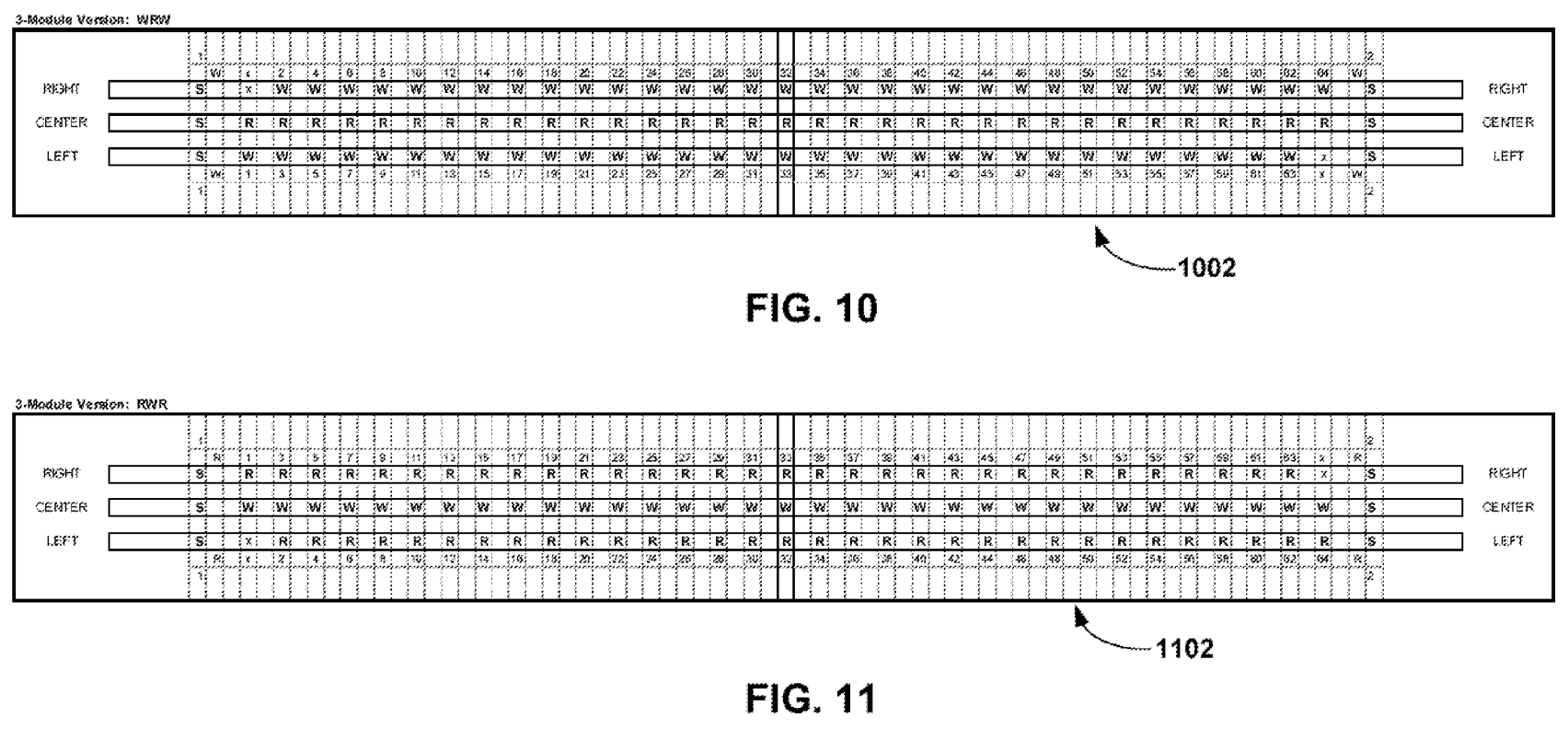
Figure 12:
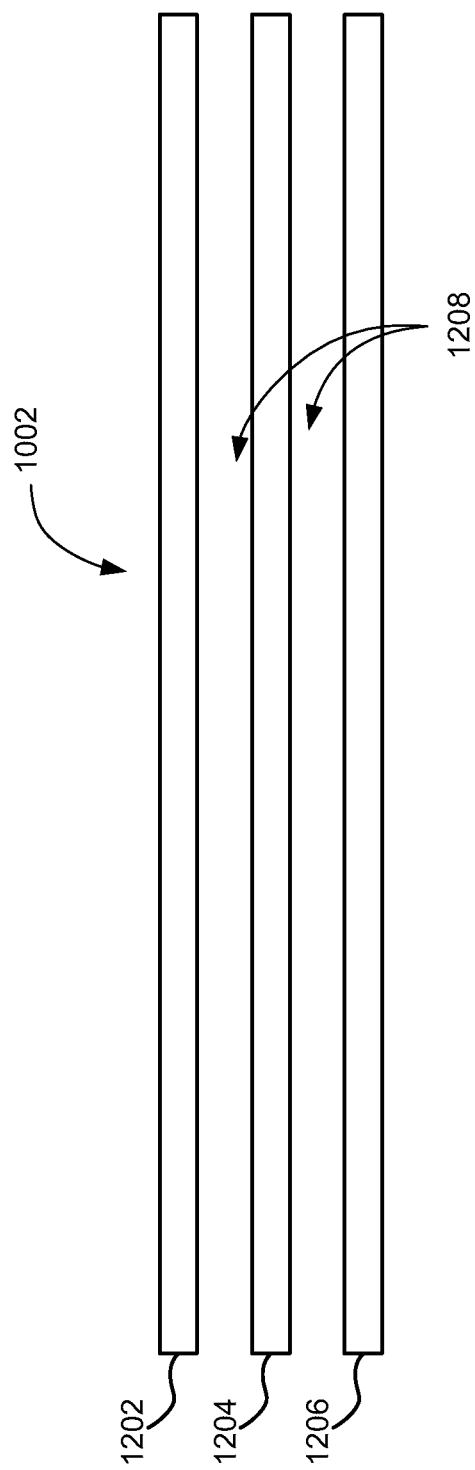
FIG. 12 is a top down view of magnetic head 1002 of FIG. 10.

In other embodiments, such as those shown in FIGS. 10 and 11, a magnetic head can be constructed with three (or more) modules, instead of two. FIG. 12 illustrates a top down view of the magnetic head 1002 of FIG. 10 having modules 1202, 1204, 1206 providing a tape bearing surface, and gaps 1208 therebetween.

In a further embodiment, shown in FIG. 10, a WRW head comprises an inner module (CENTER) comprising an array of data readers R; and first and second outer modules (LEFT, RIGHT) flanking the inner module each having an array of writers W. The outer modules are identical. A number of active data writers in each outer module is less than a number of active data readers in the inner module. For the first outer module, one of the active data writers is aligned with one of the data readers positioned towards a first end of the inner module array in the direction generally parallel to the path of tape travel thereacross. The data reader may be at the end of the array. Alternatively, the data reader may be at the end of an embedded array (as in arrays in a multiformat embodiment similar to that shown in FIG. 9) rather than at the end of the array. For the second outer module, one of the active data writers is aligned with one of the data readers positioned towards a second end of the inner module array in the direction generally parallel to the path of tape travel thereacross. In the illustrative embodiment shown, each of the modules has only two server readers and a transducer on the centerline, as indicated by W32-R-W33 surrounded by solid lines in the middle of the modules. The outer modules have asymmetric layouts about this centerline in such a way that the outer modules include only 32 read transducers. The inner module is symmetric about its centerline, but is not identical to the outer modules. The inner module includes 33 write transducers, but only two servo readers (or optionally one or no servo readers). This allows the WRW head to be comprised of only two distinct types of modules, one type for the outer write modules, and one for the inner read module.

In another embodiment, shown in FIG. 11, a RWR magnetic head comprises an inner module (CENTER) comprising an array of data writers; and first and second outer modules (RIGHT, LEFT) flanking the inner module. The outer modules are identical, each outer module comprising an array of data readers. A number of active data readers in each outer module is less than a number of active data writers in the inner module. For the first outer module, one of the active data readers is aligned with one of the data writers at a first end of the inner module array in the direction generally parallel to the path of tape travel thereacross, The data writer may be at the end of the array. Alternatively, the data writer may be at the end of an embedded array (as in arrays in a multiformat embodiment similar to that shown in FIG. 9) rather than at the end of the array. For the second outer module, one of the active data readers is aligned with one of the data writers positioned towards a second end of the inner module array in the direction generally parallel to the path of tape travel thereacross. In the illustrative embodiment shown, each of the modules may have only two server readers and a transducer on the centerline, as indicated by R33-W-R32 surrounded by solid lines in the middle of the modules. The outer modules have asymmetric layouts about this centerline in such a way that the outer modules include only 32 read transducers. The inner module is symmetric about its centerline, but is not identical to the outer modules, including 33 write transducers, but still only two servo readers (or optionally one or no servo readers). This allows the RWR head to be comprised of only two distinct types of modules, one type for the outer read modules, and one for the inner write module.

In another approach, the top and bottom modules may be as shown in head 802 except that only 32 of the locations may be used (either 1-32 or 2-33, leaving the first or last location open), thus eliminating a reader or writer from the opposite end of each module. In addition, the center module (not shown) may have a complete set of 33 transducers, meaning that the end channels may be a transducer pair (P) on each side, rather than splitting the transducer pair as in the top and bottom modules. This may result in a reader-writer-reader (RWR) or writer-reader-writer (WRW) on each channel on the head. Also, the top and bottom modules may be manufactured with a transducer pair (P) on each end, with one transducer pair (P) not connected or operational, and the other transducer pair (P) only operational for one of the reader or writer, as appropriate. This allows for simplified manufacturing since only one type of module is to be manufactured, instead of three different types.

Again, as alluded to above, the embodiments of FIG. 10 or 11 may incorporate a multiformat design as in FIGS. 6-9, with appropriate modifications of course. For instance, an embodiment of FIG. 10 having outer modules each with a multiformat array of writers W at positions similar to those of FIG. 9, with or without paired transducers at each location, preferably without. Similarly, the inner module of such an embodiment may have readers R at positions similar to those of FIG. 9, with or without paired transducers at each location, preferably without. Accordingly, in one format, one subset of the readers and/or writers are used. In other format, another subset of the readers and/or writers are used.

In a further approach to a multiformat embodiment of FIG. 10, only writers in an array compatible with the new format may be present on the outer modules, with the inner module having readers arranged to read both legacy and new formats. This allows backward compatibility, at least for retrieving data from legacy tapes.

In a further approach to a multiformat embodiment of FIG. 11, readers in an array compatible with the legacy and new formats may be present on the outer modules, with the inner module having writers arranged to write only a new format. This allows backward compatibility, at least for retrieving data from legacy tapes.

In a variation on the embodiments of FIG. 10 or 11, such embodiments may have a multiformat array as in FIG. 9, the inner array of the modules may be adjusted for the top and bottom modules so that 32 of the locations may be used (either 1-32 or 2-33, leaving the first or last location open), thus eliminating a reader and/or writer from the opposite end of the inner array on each module. In addition, the center module (not shown) may have a complete set of 33 transducers in the inner array, meaning that the end channels may be a transducer pair (P) on each side, rather than splitting the transducer pair as in the top and bottom modules. This may result in a reader-writer-reader (RWR) or writer-reader-writer (WRW) on each inner array channel on the head.

In another approach to the various embodiments, the top and bottom modules may be manufactured with a transducer pair (P) on each end of the inner array, with one of the transducers in the pair (P) not connected or operational, and the other transducer pair (P) being similarly only operational for one of the reader or writer, as appropriate.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
an inner module comprising an array of data readers; and
first and second outer modules flanking the inner module and spaced therefrom, thereby defining a gap in a tape bearing surface of the head between the first and inner modules and a gap in the tape bearing surface of the head between the second and inner modules,
wherein the outer modules are identical, each outer module comprising an array of data writers,
wherein a number of active data writers in each outer module is less than a number of active data readers in the inner module,
wherein, for the first outer module, one of the active data writers is aligned with one of the data readers positioned towards a first end of the inner module array in a direction generally parallel to the path of tape travel thereacross,
wherein, for the second outer module, one of the active data writers is aligned with one of the data readers positioned towards a second end of the inner module array in the direction generally parallel to the path of tape travel thereacross,
wherein, for each module, one of the data transducers is positioned along a centerline of the array, wherein the centerline is oriented in a direction perpendicular to a longitudinal axis of the array.

2. A magnetic head as recited in claim 1, wherein, for each module, only one servo reader is positioned on each side of the array.

3. A magnetic head as recited in claim 2, wherein, for each module, a distance between the servo readers is such that the servo readers read servo bands on a tape written in a first format and servo bands on a tape written in a second format.

4. A magnetic head as recited in claim 1, wherein a first subset of the transducers in at least one of the arrays is operable for reading or writing data in a first tape format, wherein a second subset of the transducers is operable for reading or writing data in a second tape format, at least some of the transducers being present in both subsets, wherein, for each module, the transducers positioned along the centerline of the array belong to only one of the subsets.

5. A magnetic head as recited in claim 1, wherein a first subset of the transducers in at least one of the arrays is operable for reading or writing data in a first tape format, wherein a second subset of the transducers is operable for reading or writing data in a second tape format, at least some of the transducers being present in both subsets, wherein, for each array, the transducers in each subset have about the same center to center spacing.

6. A magnetic head as recited in claim 1, wherein a first subset of the transducers in at least one of the arrays is operable for reading or writing data in a first tape format, wherein a second subset of the transducers is operable for reading or writing data in a second tape format, at least some of the transducers being present in both subsets, wherein, for each array, the transducers in the first subset have a different center to center spacing than the transducers in the second subset.

7. A magnetic head as recited in claim 6, wherein, for each module, one of the data transducers is positioned along a centerline of the array, wherein the centerline is oriented in a direction perpendicular to a longitudinal axis of the array.

8. A magnetic head as recited in claim 6, further comprising, for each module, a pair of servo readers interleaved with the transducers.

9. A tape drive system, comprising:
a magnetic head as recited in claim 1;
a drive mechanism for passing a magnetic recording tape over the head; and
a controller in communication with the head.

10. A magnetic head as recited in claim 1, wherein an outer writer of the first module is not aligned with a writer of the second module in an intended direction of tape travel thereacross.

11. A magnetic head as recited in claim 10, wherein an outer writer of the second module is not aligned with a writer of the first module in the intended direction of tape travel.

12. A magnetic head as recited in claim 1, wherein the inner module also has servo readers.

* * * * *